(12) United States Patent
Machuletz et al.

(10) Patent No.: US 10,247,356 B2
(45) Date of Patent: Apr. 2, 2019

(54) CONFIGURABLE SAFETY INPUT

(71) Applicant: Rockwell Automation Technologies, Inc., Mayfield Heights, OH (US)

(72) Inventors: Norbert Machuletz, Wetter (DE); Thomas Helpenstein, Wuppertal (DE); Oliver Heckel, Frechen (DE); Rudolf Laurenz Papenbreer, Wuppertal (DE)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 188 days.

(21) Appl. No.: 15/460,377

(22) Filed: Mar. 16, 2017

(65) Prior Publication Data
US 2018/0266626 A1 Sep. 20, 2018

(51) Int. Cl.
F16P 3/20 (2006.01)
F16P 3/00 (2006.01)

(52) U.S. Cl.
CPC ................................. *F16P 3/00* (2013.01)

(58) Field of Classification Search
CPC ............................. F16P 3/00; B23Q 11/0078
USPC ............................................... 307/326, 328
See application file for complete search history.

(56) References Cited

U.S. PATENT DOCUMENTS

2005/0057868 A1* 3/2005 Pullmann ............... G05B 9/03
361/62

* cited by examiner

*Primary Examiner* — Carlos D Amaya
(74) *Attorney, Agent, or Firm* — Amin, Turocy & Watson, LLP

(57) ABSTRACT

A configurable industrial safety relay device allows individual adjustment of rated input currents for each safety input. The safety relay device can support a number of programmable configuration settings or parameters, including parameters that allow a desired input current to be individually selected for each safety input. In this way, an input current can be selected for each safety input that is appropriate for the safety circuit being monitored by the safety input. In particular, an input current can be selected that ensures reliable detection of the safety signal by the safety input while substantially minimizing power consumption by the safety relay device.

20 Claims, 11 Drawing Sheets

FIG. 6

INPUT CURRENT CONFIGURATION — 602
- Safety Input 00: 2mA
- Safety Input 01: 2mA
- Safety Input 02: 10mA — 604
- Safety Input 03: 3mA
- Safety Input 04: 5mA

FIG. 7

INPUT CURRENT CONFIGURATION — 702
- Safety Input 00: 5
- Safety Input 01: 1
- Safety Input 02: 3 — 704
- Safety Input 03: 0
- Safety Input 04: 0

FIG. 8

Safety Input 00 — 802
- E-Stop | 5 — 806
- Safety Mat | 1
- None | 0
- None | 0
- None | 0

804

CONFIGURABLE SAFETY INPUT

BACKGROUND

The subject matter disclosed herein relates generally to industrial safety systems, and, more particularly, to configurable safety relays.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a safety relay device is provided, comprising a configuration interface component configured to receive configuration data identifying a safety input, of a set of safety inputs supported by the safety relay device, and specifying an input current level; and an input current configuration component configured to, in response to receipt of the configuration data, configure a monitoring circuit associated with the safety input to operate in accordance with the input current level.

Also, one or more embodiments provide a method, comprising receiving, by a safety relay device, configuration data comprising identification of a safety input supported by the safety relay device and input current information; and in response to the receiving, configuring, by the safety relay device, the safety input identified by the configuration data to operate at a rated input current determined based on the input current information.

Also, according to one or more embodiments, a non-transitory computer-readable medium is provided having stored thereon instructions that, in response to execution, cause a safety relay device to perform operations, the operations comprising receiving configuration data that specifies a safety input supported by the safety relay device and input current information; in response to the receiving, configuring monitoring circuitry associated with the safety input to operate at a rated input current determined based on the input current information.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 6 is an illustration of an example, non-limiting interface display that can be used to set input current parameters for the respective safety inputs.

FIG. 7 is an illustration of an example, non-limiting interface display that can be used to set a number of safety input devices for respective safety inputs of a safety relay device.

FIG. 8 is an illustration of an example, non-limiting interface display that can be used to set types and numbers of safety input devices for a safety input of a safety relay device.

DETAILED DESCRIPTION

Figure 1:
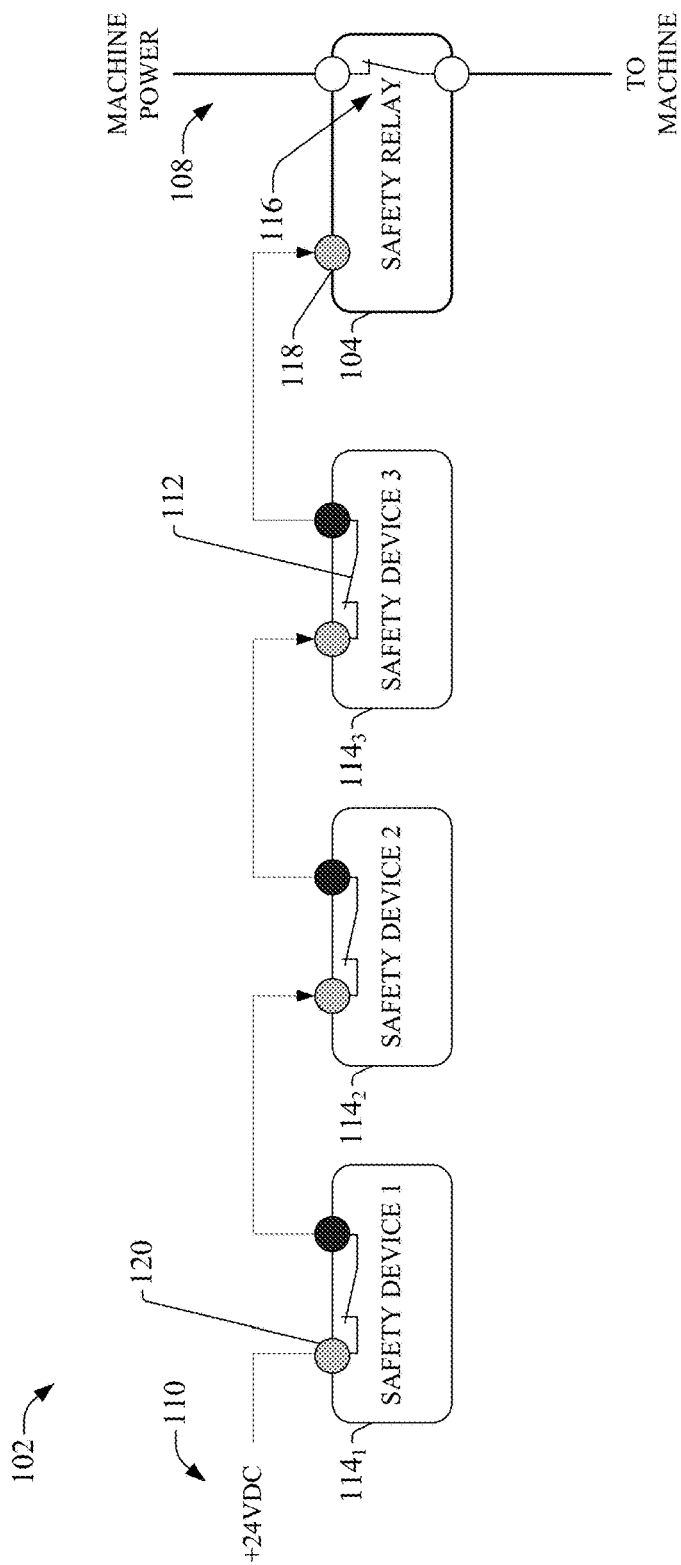
FIG. 1 is a generalized diagram illustrating an example safety system that includes a safety relay and three safety input devices.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Modern industrial automation systems often include a number of hazardous machine access points that, if inappropriately breached, may cause injury to an operator. These access points can expose the operator to risks associated with dangerous machine components, including but not limited to crushing by moving parts, electrocution through contact with exposed high-voltage lines or components, chemical burn, laceration or dismemberment by a moving blade, radiation exposure, or other such hazards To mitigate the risks associated with these access points, plant engineers typically implement safety systems designed to protect operators who interact with the access points. These safety systems often include a safety relay (also referred to as a safety controller) that monitors the states of various safety input devices (e.g., emergency stop buttons, safety gate or door switches, photoelectric detectors, safety mats or pull-cord devices, etc.), and disconnects power to hazardous machine components if any of the safety input devices indicate a potentially unsafe condition. FIG. 1 is a generalized diagram illustrating an example safety system 102 that includes a safety relay 104 and three safety input devices $114_1$, $114_2$, and $114_3$. The safety input devices 114 are electrically connected in series, and the series-connected safety input devices 114 are electrically connected to an available safety input terminal 118 of the safety relay by connecting an output terminal of safety input device $114_3$—the device nearest the safety relay 104—to the safety input terminal 118. A 24 VDC signal 110 is applied to an input terminal 120 of safety input device $114_1$ (the device farthest from the safety relay 104). The 24 VDC signal 110 may be provided by the safety relay 104 itself, or may be provided by a 24 VDC power source that is common to the safety input devices 114 and the safety relay 104. The 24 VDC signal may be a constant 24 VDC voltage a recognizable 24 VDC pulsed signal (other voltage levels may also be used for the safety input signal in some implementations). Each safety input device 114 includes a contact 112 (or dual redundant contacts) that is designed to remain closed while the safety input device is in the normal state (non-safe), allowing the 24 VDC signal 110 to pass. As long as all safety input devices 114 on the safety circuit are in their respective normal states, the 24 VDC signal 110 is allowed to pass to the safety input terminal 118 of the safety relay 104.

The safety relay 104 operates a resettable contact 116 to selectively control the connection of machine power 108 (e.g., AC power) to at least one machine, motor, or industrial device. The safety relay 104 controls the contact 116 to allow machine power 108 (e.g., high AC voltage) to pass to one or more connected machines, or to isolate the machine power 108 from the one or more machines in order to place the one or more machines in a safe state. During operation, the safety relay 104 holds contact 116 closed as long as the 24 VDC signal is detected at the safety input terminal 118. If any of the safety input devices 114 switches from normal state to a safe state (e.g., an emergency stop button is pressed, a safety door is opened causing a proximity switch to open, a safety cord is pulled, etc.), the safety input device's contact 112 opens, thereby removing the 24 VDC signal from the safety input terminal 118. When the safety relay 104 detects the loss of the 24 VDC signal at the safety input terminal 118, the safety relay 104 opens contact 116, thereby removing machine power from the one or more machines in order to prevent hazardous operation. Typically, safety relay 104 will only allow the contact 116 to be reset if the 24 VDC signal is detected at the safety input terminal 118, indicating that all safety input devices 114 have validated their safety functions and are in their respective normal (non-safe) states. Some safety relays 104 also support execution of safety control logic, which allows the removal of machine power by contact 116 to be conditional on the combines states of multiple safety inputs in accordance with a user-defined safety program.

An example safety input device 114 may comprise a proximity switch installed on a safety gate that provides access to a hazardous machine. A safety circuit can be designed such that the safety relay 104 operates contact 116 to isolate power from the one or more machines when the proximity switch indicates that the safety gate is open. Other example safety input devices 114 can include, but are not limited to, emergency stop pushbuttons, industrial safety mats that detect human presence at a particular area based on weight detection, emergency pull-cord devices, photoelectric or laser-based sensors, or other such safety detection devices.

Figure 2:
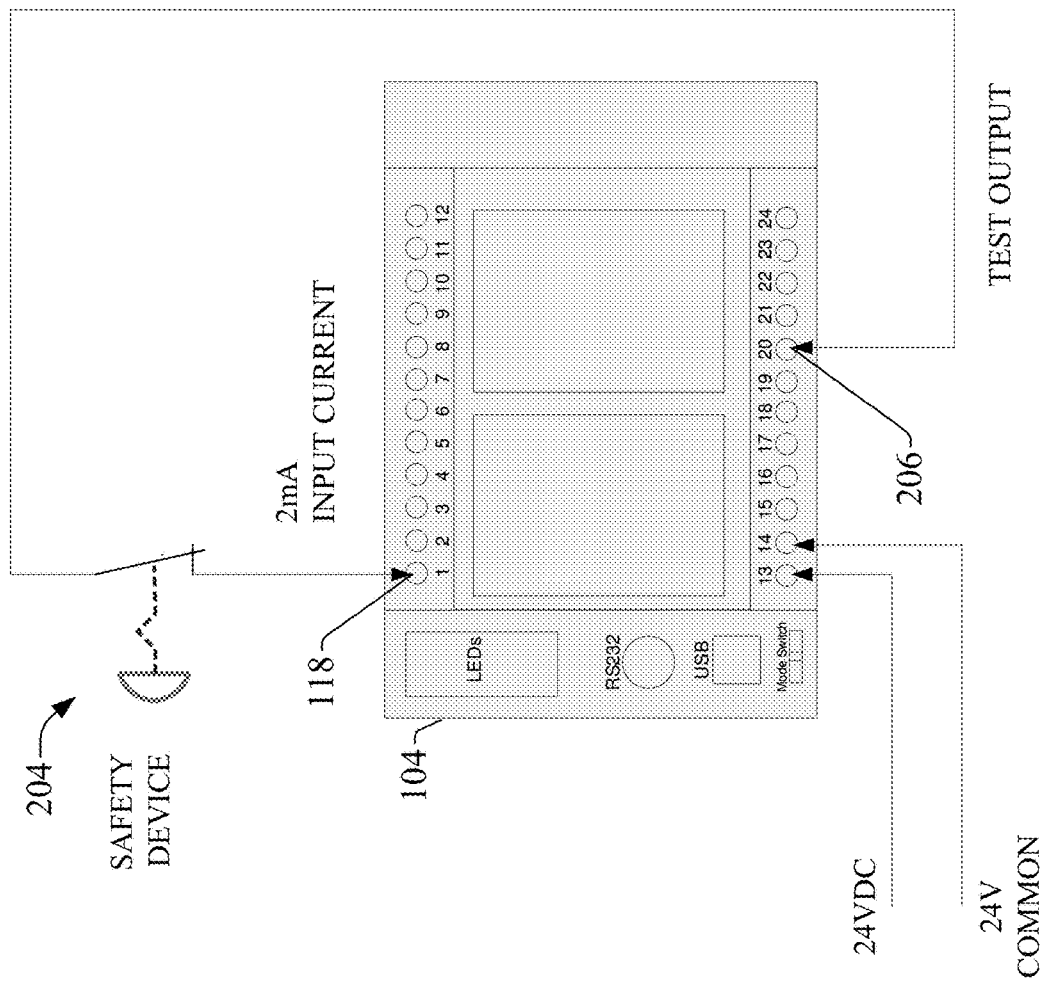
FIG. 2 is a diagram illustrating an example wiring schematic for a safety circuit that includes a single safety input device.

FIG. 2 is a diagram illustrating an example wiring schematic for a safety circuit that includes a single safety input device 204. In this example, the safety circuit comprises a single safety input device 204, depicted in FIG. 2 as an emergency stop pushbutton. One side of the safety input device's contact is connected to an available safety input terminal 118 on safety relay 104 (in some scenarios, safety input device 204 may comprise dual redundant contacts, where each of the two redundant contacts is connected to a separate safety input; however, FIG. 2 only depicts a single contact attached to a single safety input terminal for clarity). The other side of the safety input device's contact is connected to a test output terminal 206 that generates a 24 VDC signal. Although FIG. 2 depicts only one safety input terminal 118 being used, a typical safety relay 104 may include multiple safety input terminals, which allow multiple safety circuits to be monitored by the safety relay 104. FIG. 2 also depicts 24 VDC and 24V common lines connected to the power supply terminals of the safety relay 104.

Conventionally, the safety inputs of a safety relay 104 are rated for a fixed input current at the nominal supply voltage (e.g., 24 VDC). This rated safety input current can vary across different safety relay models or vendors, but is typically fixed for a given safety relay model and/or vendor. In the example depicted in FIG. 2, the rated safety input current is 2 mA; that is, while the safety input device 204 is in its normal state (contactor in the closed position), the safety input terminal 118 draws approximately 2 mA of current.

Figure 3:
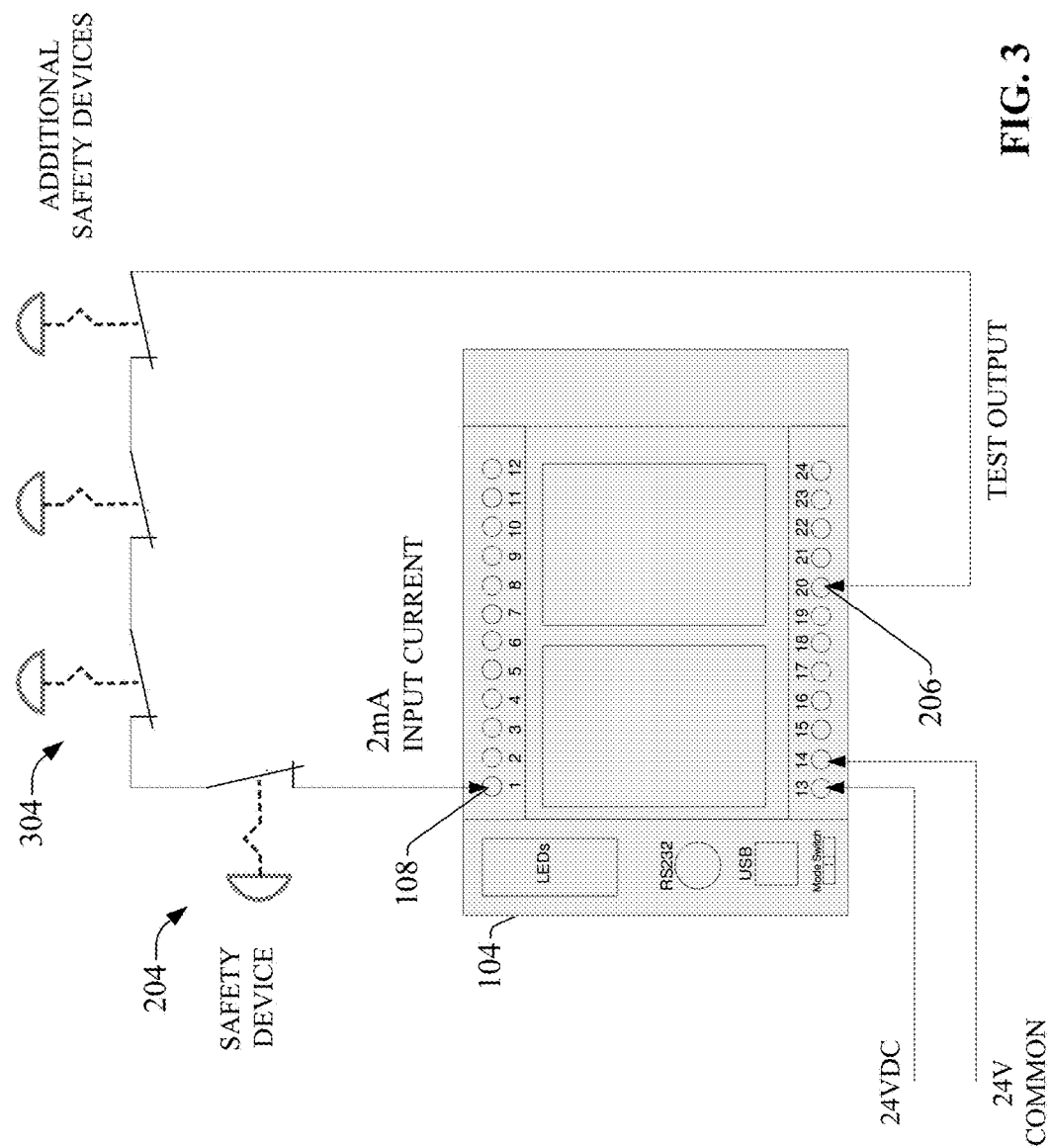
FIG. 3 is a diagram illustrating an example wiring schematic for a safety circuit that includes multiple series-connected safety input devices.

FIG. 3 is a diagram illustrating an example wiring schematic for a safety circuit that includes multiple series-connected safety input devices 304. If a relatively large number of safety input devices 304 are added to a safety circuit being monitored by a safety relay 104 having a relatively low rated safety input current (e.g., 2 mA), the ability of the safety relay 104 to reliably detect the 24 VDC safety input signal may suffer since the additional load on the safety circuit can cause the low safety input current to intermittently drop below an operating tolerance for the signal detection circuitry. As a result, a heavily loaded safety circuit may cause the safety relay to intermittently disconnect machine power even if all safety input devices 304 are in their respective normal states.

While safety relays having higher safety input currents may not experience these issues, higher safety input currents cause the safety relay to consume more power relative to lower safety input currents. Consequently, a safety relay having a relatively high safety input current (e.g., 30 mA) that monitors a safety circuit comprising a relatively small number of safety devices may be consuming more power than is necessary. Thus, with fixed safety input currents, there is a trade-off between reliability and energy efficiency.

To address these and other issues, one or more embodiments of the present disclosure provide a configurable safety relay that allows the rated input current to be adjusted for each safety input. One or more embodiments of the configurable safety relay can include an interface component that allows the user to configure a number of programmable configuration settings. These settings can include safety input current settings for each safety input associated with the safety relay. The safety input current settings can be adjusted by the user—e.g., using a configuration interface that executes on a client device communicatively connected to the safety relay—to define an input current level for each safety input individually. In some embodiments, the configuration interface can present multiple predefined input current levels for each safety input, and the user can select a desired input current level from the predefined current levels (e.g., 2 mA, 3 mA, 10 mA, etc.). When the configuration settings are compiled by the safety relay, the monitoring circuitry for each safety input is appropriately configured to support the input current level selected for that input (e.g., by configuring an input impedance of the safety input, or by other circuit configuration means). In this way, the input current for each safety input can be customized to a level appropriate to the particular safety circuit or safety application being monitored by the safety input. In particular, an input current level can be selected that ensures reliable monitoring of the safety circuit while minimizing power consumption by the safety relay.

Figure 4:
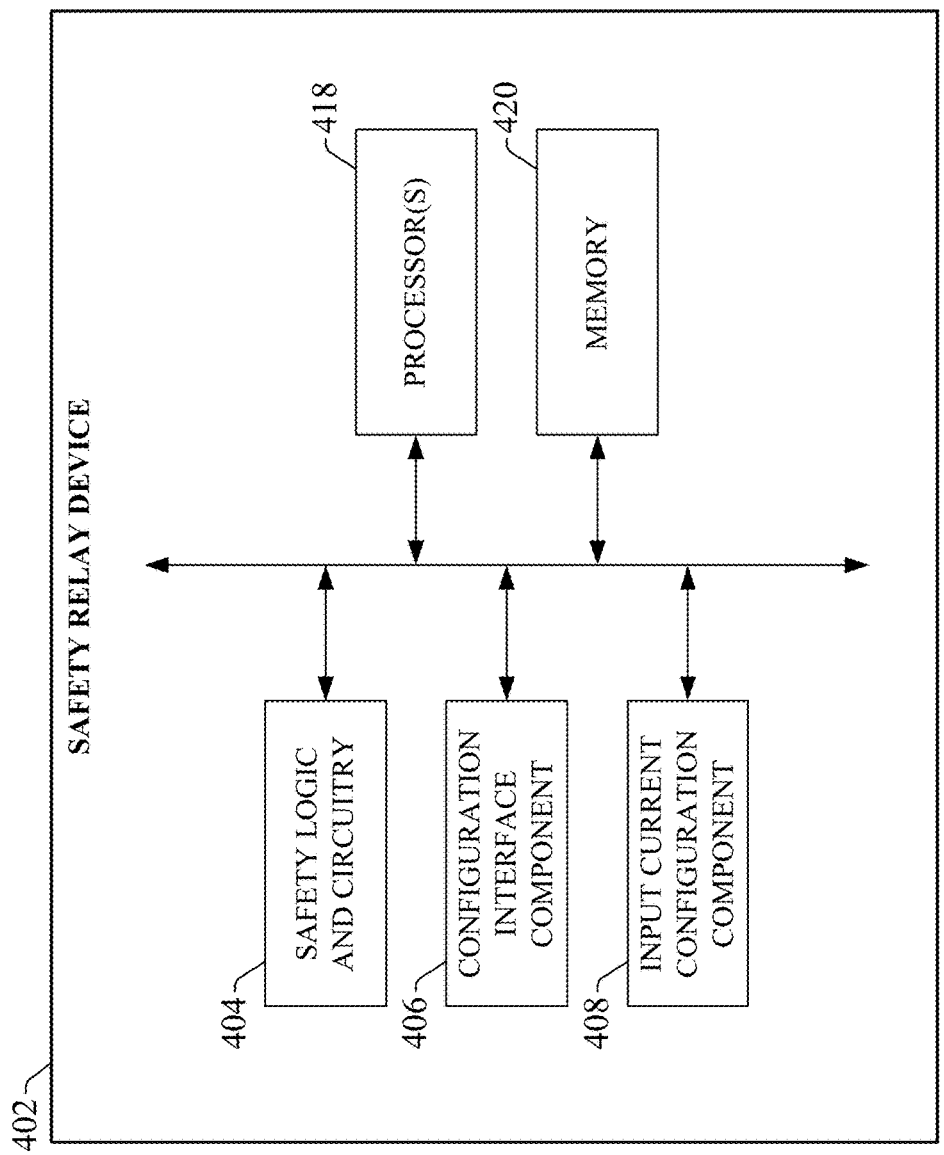
FIG. 4 is a block diagram of an example safety relay device.

FIG. 4 is a block diagram of an example safety relay device according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Safety relay device 402 can include safety logic and circuitry 404, a configuration interface component 406, an input current configuration component 408, one or more processors 418, and memory 420. In various embodiments, one or more of the safety logic and circuitry 404, configuration interface component 406, input current configuration component 408, the one or more processors 418, and memory 420 can be electrically and/or communicatively coupled to one another to perform one or more of the functions of the safety relay device 402. In some embodiments, one or more of components 404, 406, and 408, can comprise software instructions stored on memory 420 and executed by processor(s) 418. Safety relay device 402 may also interact with other hardware and/or software components not depicted in FIG. 4. For example, processor(s) 418 may interact with one or more external user interface devices, such as a keyboard, a mouse, a display monitor, a touchscreen, or other such interface devices.

Safety logic and circuitry 404 can comprise the hardware and/or software that carries out the basic safety monitoring and control functionality of the safety relay device 402. This can include, for example, circuitry associated with the safety inputs, monitoring circuitry and/or logic configured to control one or more safety contacts based on monitored statuses of the safety inputs, or other such hardware and/or software.

Configuration interface component 406 can be configured to interface with, and exchange data with, a safety relay configuration application. In some embodiments, the safety relay configuration application can execute on a client device (e.g., a laptop computer, a tablet computer, a mobile device such as a mobile phone or other portable client device, a desktop computer, etc.) that is communicatively connected to the safety relay device via the configuration interface component 406. In various embodiments, the configuration interface component 406 can interface with the client device that executes the configuration application over a local hardwired connection between the configuration system and the safety relay device 402 (e.g., universal serial bus, RS232, etc.), or over a networked connection (e.g., Ethernet, Modbus, Common Industrial Protocol, Controlnet, Devicenet, etc.). In some embodiments, the configuration interface component 406 can also interface with the configuration application executing on the client device over a local or remote wireless connection, including but not limited to a near field connection, a Wi Fi connection, a connection over wireless public network such as a secure connection over the internet, etc.

Moreover, in some embodiments, rather than interfacing with a configuration application that executes on the client device, the configuration interface component 406 may be configured to serve a configuration interface to a client device that is communicatively connected to the safety relay device 402. In such embodiments, the configuration interface component 406 can be configured to render, on the client device, display screens that include controls (e.g. data entry fields, selectable parameter selection controls, etc.) for entering configuration parameter values or selections. In addition to other configuration settings, the display screens can include display controls for entering or selecting input current level values (or data that can be used to select a suitable input current level) for each safety input supported by the safety relay device 402.

Input current configuration component 408 can be configured to modify relevant components of safety logic and circuitry 404 in accordance with the input current configuration settings received via the configuration interface component 406. For example, if a user configures Safety Input 03 of the safety relay device to have an input current of 10 mA in order to suit the requirements of a safety application in which a large number of safety input devices are monitored by that safety input, the input current configuration component 408 can modify the relevant portions of safety logic and circuitry 404 (e.g., the monitoring circuitry associated with Safety Input 03) such that the indicated safety input will have a rated input current of 10 mA. Such modifications may include, but are not limited to, changing an input impedance of the safety input monitoring circuitry associated with Safety Input 03.

The one or more processors 418 can perform one or more of the functions described herein with reference to the systems and/or methods disclosed. Memory 420 can be a computer-readable storage medium storing computer-executable instructions and/or information for performing the functions described herein with reference to the systems and/or methods disclosed.

Figure 5:
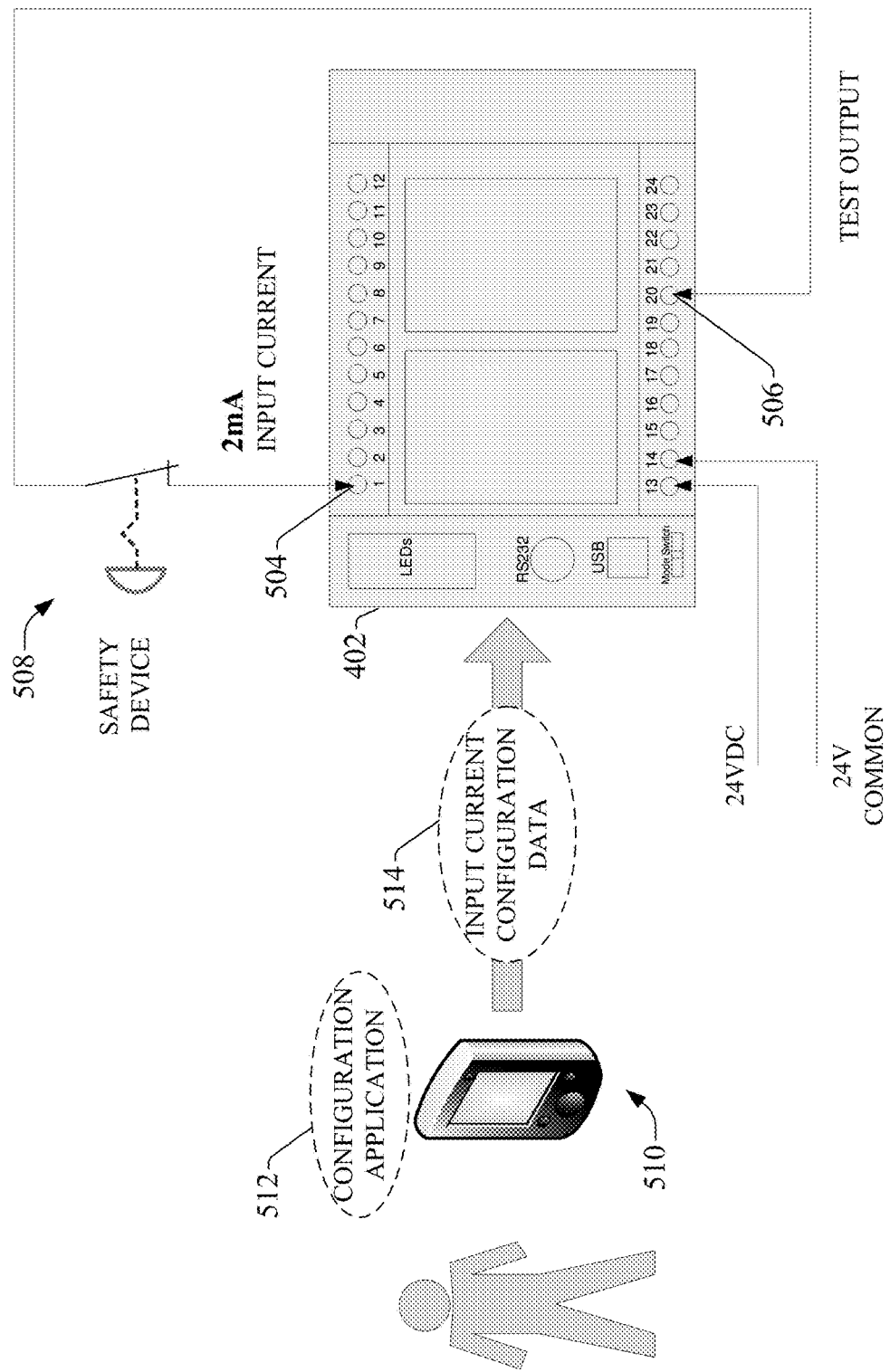
FIG. 5 is a diagram illustrating configuration of a safety input current.

FIG. 5 is a diagram illustrating configuration of a safety input current according to one or more embodiments. In the illustrated example, safety relay 402 is configured to monitor a safety circuit comprising a single safety input device 508. The 24 VDC signal for the safety circuit is provided by a test output terminal 506 of the safety relay device 402, and the safety circuit is monitored by a safety input terminal 504 of the safety relay device 402. As described above, the safety relay device 402 is configured to control one or more internal safety contacts based on a determination of whether the 24 VDC signal generated by the test output terminal 506 is received at the safety input terminal 504. Although the illustrated example depicts a configuration in which the 24 VDC signal for the safety circuit is generated by a test output terminal 506, in some configurations the 24 VDC signal may be provided by a separate 24 VDC power supply that is common to the safety circuit and the safety relay device 402. Also, while the examples described herein assume a 24 VDC signal is used to drive the safety circuit, other types of safety circuit signals are also within the scope of one or more embodiments of this disclosure.

Initially, the input current settings for each safety input of the safety relay device 402 may be set to a default level. In the present example, it is assumed that the default safety input current for all safety inputs is 5 mA. If the user determines that 5 mA will be an excessively high input current given the small load on the safety circuit (a single safety input device 508), the user can interface with the safety relay device 402 using a client device 510 and modify the input current parameter corresponding to the relevant safety input. In some embodiments, client device—e.g., a laptop computer, a tablet computer, a mobile phone, a desktop computer, etc.—can execute a configuration application 512 that interfaces with the safety relay's configuration interface component 406 over a hardwired or wireless connection. The configuration application 512 is designed to allow the user to program and configure a number of functional aspects of the safety relay device 402. Once communication between the client device 510 and safety relay device 402 is established, the configuration application can download configuration data to the safety relay device 402 based on configuration and programming input provided to the configuration application 512 by the user. For example, in some embodiments the user can develop safety relay logic within the development environment of the configuration application 512, and download the developed program to safety relay device 402. Additionally, the configuration application 512 can read and display status data from the safety relay device 402. For example, the configuration application 512 can render status data on a graphical environment having a similar structure to the development environment used to create the safety relay logic, allowing the user to monitor the statuses of the safety circuit(s) connected to the safety relay device 402 within the logic environment.

In some embodiments, rather than configuration application 512 being installed on client device 510, the configuration interface component 406 of safety relay device 402 can be configured to generate and serve the relevant interface display screens to the client device 510. In such embodiments, client device 510 acts as a thin client to the configuration interface generated by the safety relay device 402. The configuration interface component 406 can render the relevant configuration interface displays or windows on the client device's display (e.g., via a browser application, a thin client application, or another type of visualization application) upon determining that the user of the client device 510 is authorized to modify configuration parameters on the safety relay device 402. In some embodiments, this user authorization can be enforced by the configuration interface component 406 using password verification, biometric verification, or other such user authentication means.

The configuration application 512 can also allow the user to configure various operating parameters for the safety relay device 402. These parameters can include, for example, communication parameters, parameters that set functions for configurable input or output terminals, test output signal configuration parameters, safety input filter time parameters, or other such configuration settings.

The configurable parameters also include input current parameters for each safety input supported by the safety relay device 402. FIG. 6 is an illustration of an example, non-limiting interface display 602 that can be used to set input current parameters for the respective safety inputs. Interface display 602, or a configuration screen having another format for setting input current values, can be generated by configuration application 512 or by configuration interface component 406. Example display 602 includes entry fields 604 for each safety input supported by the safety relay device. In the illustrated example, each of the entry fields 604 comprises a drop-down selection menu that allows the user to select an input current setting from a list of predefined current settings (e.g., 2 mA, 3 mA, 10 mA, 30 mA, etc.). Various embodiments of the safety relay device 402 can support any number of selectable predefined input currents. Other types of entry fields 604 are also within the scope of one or more embodiments, including but not limited to manual entry fields, selectable radio buttons, checkboxes, etc.

Once entered and downloaded to the safety relay device 402, the safety input current selections can be passed to the input current configuration component 408, which makes appropriate modifications to the safety relay's monitoring circuitry in accordance with the indicated input currents. For example, the input current configuration component 408 can, for each safety input supported by the safety relay device 402, modify the input impedance and/or any other circuit parameters necessary to bring the input current rating for the safety input into conformance with the input current level specified by the user-provided data.

FIG. 7 is an illustration of another example, non-limiting interface display 702 that can be used to set input current parameters for the respective safety input. In this example, rather than providing a drop-down list of available input current settings for each safety input, interface display 702 instead allows the user to specify the number of safety input devices on each safety input. The number of safety input devices can be specified in entry fields 704 associated with each safety input (where each safety input corresponds to a safety circuit to be monitored by the safety relay device). This device quantity information can be passed to the input current configuration component 408, which translates the number of safety input devices to a suitable input current value for each safety input. In general, the greater the number of safety input devices on a safety circuit, the higher the input current that may be necessary to ensure reliable monitoring by the safety input. For example, the input current configuration component 408 may be configured to set the rated input current for a safety input to be 2 mA if the number of safety devices is less than four, 3 mA if the number of safety devices is between five and ten, 5 mA if the number of safety devices is between 11 and 20, and 10 mA if the number of safety devices is greater than 20 (these values are only intended to be exemplary, and embodiments described herein are not limited to this particular mapping between the number of safety input devices and input currents).

FIG. 8 is an illustration of yet another example, non-limiting interface display 802 that can be used to set input current parameters for the respective safety inputs. In this example, rather than listing all available safety inputs on the display, interface display 802 is specific to a selected one of the safety inputs (e.g., safety input 00). Display 802 can be invoked in response to selection of one of the supported safety inputs (e.g., Safety Input 00) that is to be configured. Interface display 802 allows the user to identify a type of safety input device present on the safety circuit in a first data entry field 804 (e.g., emergency stop push button, safety mat, proximity switch, photoelectric sensor, pull-cord device, etc.), as well as a number of the selected type of safety input device present on the circuit in a second data field 806). The user can use the set of first data entry fields 804 to identify each type of safety device on the safety circuit, and the set of second data fields 806 to specify the number of each of the identified types of safety input devices. The configuration interface component 406 can then provide this information to the input current configuration component 408, which selects a suitable input current for the safety input based on the indicated type(s) of safety input devices and the number of each type of safety device on the circuit. In an example selection technique, the input current configuration component 408 can execute a formula that applies a suitable weight factor to each type of safety input device indicative of the load that the safety device is likely to place on the safety circuit. For each type of safety input device specified by the user, the input current configuration component 408 can multiply the weight factor associated with the safety input device with the indicated number of devices on the safety circuit corresponding to the indicated type. The input current configuration component 408 can then sum these resultant values for all of the types of safety input devices identified by the user to yield a current selection value. In general, the higher the current selection value, the higher the input current necessary to ensure reliable operation. Accordingly, the input current configuration component 408 can map the calculated current selection value to a nearest one of the predefined safety input current values, such that an input current is selected that is determined to be the lowest of the predefined input currents that will ensure reliable monitoring of the safety circuit.

It is to be appreciated that the example configuration interfaces depicted in FIGS. 6-8 are only intended to be exemplary, and that any suitable interface can be used to receive information from the use that can be leveraged to select a suitable safety input current.

Figure 9:
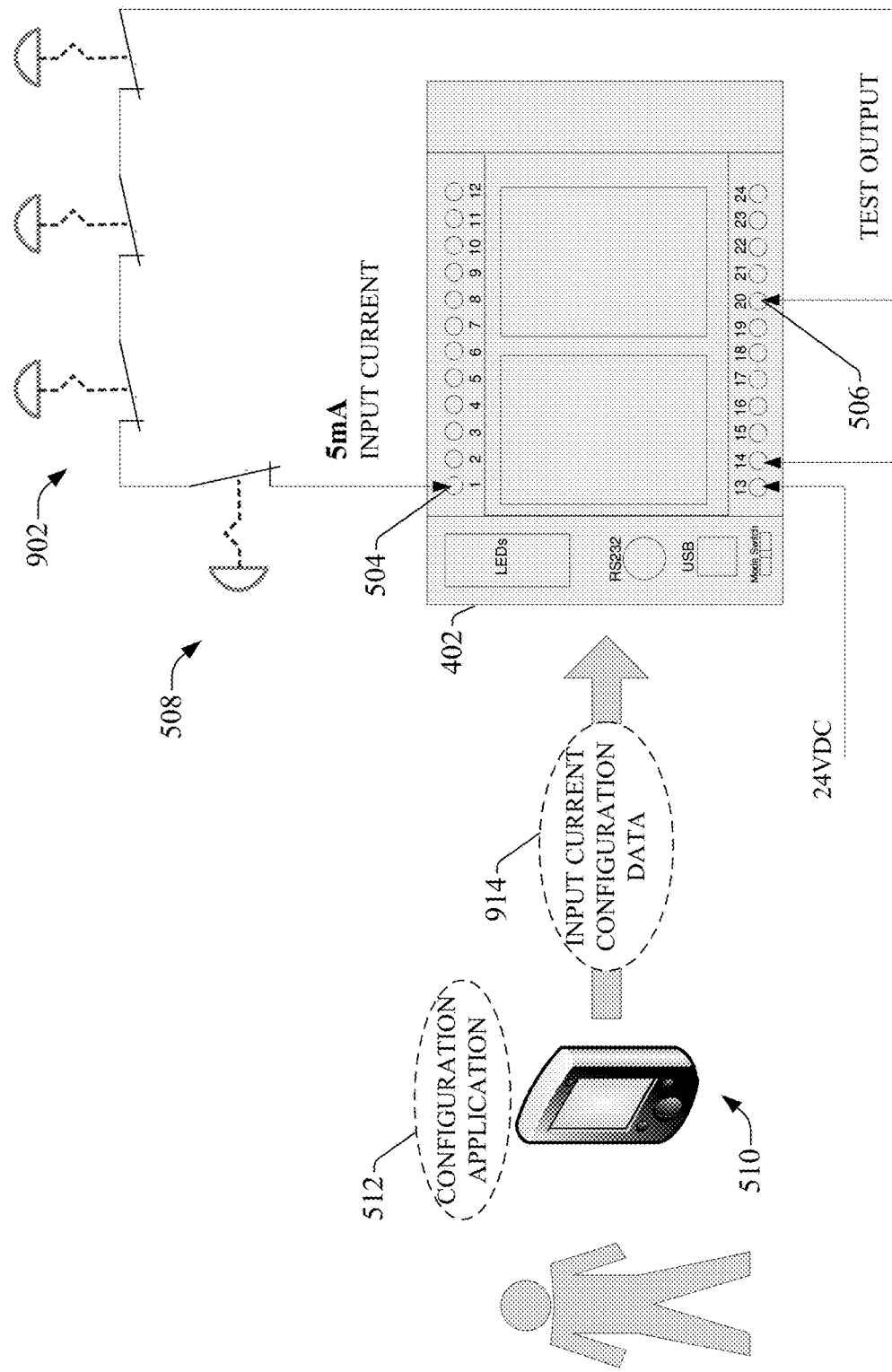
FIG. 9 is a diagram illustrating an example configuration in which multiple safety input devices have been installed on a safety circuit.

In the example illustrated in FIG. 5, since only a single safety input device 508 is present on the safety circuit monitored by the safety input corresponding to terminal 504, the user has configured the input current for the safety input to be 2 mA. FIG. 9 is a diagram illustrating another example configuration in which a number of additional safety devices 902 have been added to the safety circuit. To ensure reliable monitoring, the user has downloaded new input current configuration data 914 to the safety relay device 402 that reconfigures the safety input to support a 5 mA input current. This input current is considered high enough to ensure that the 24 VDC signal will be reliably detected by the safety input circuitry while mitigating excessive power consumption that would result from higher input currents (e.g., 10 mA or 30 mA).

Although the previous examples described configuration of safety input currents using a software configuration tool (e.g., an interface generated by configuration interface component 406 or a configuration application 512 that executes on a user's client device), some embodiments of safety relay device 402 may allow input currents to be set individually for each safety input using hardware switches (e.g., dual-in-line package switches, rotatable selection dials, etc.).

Figure 10:
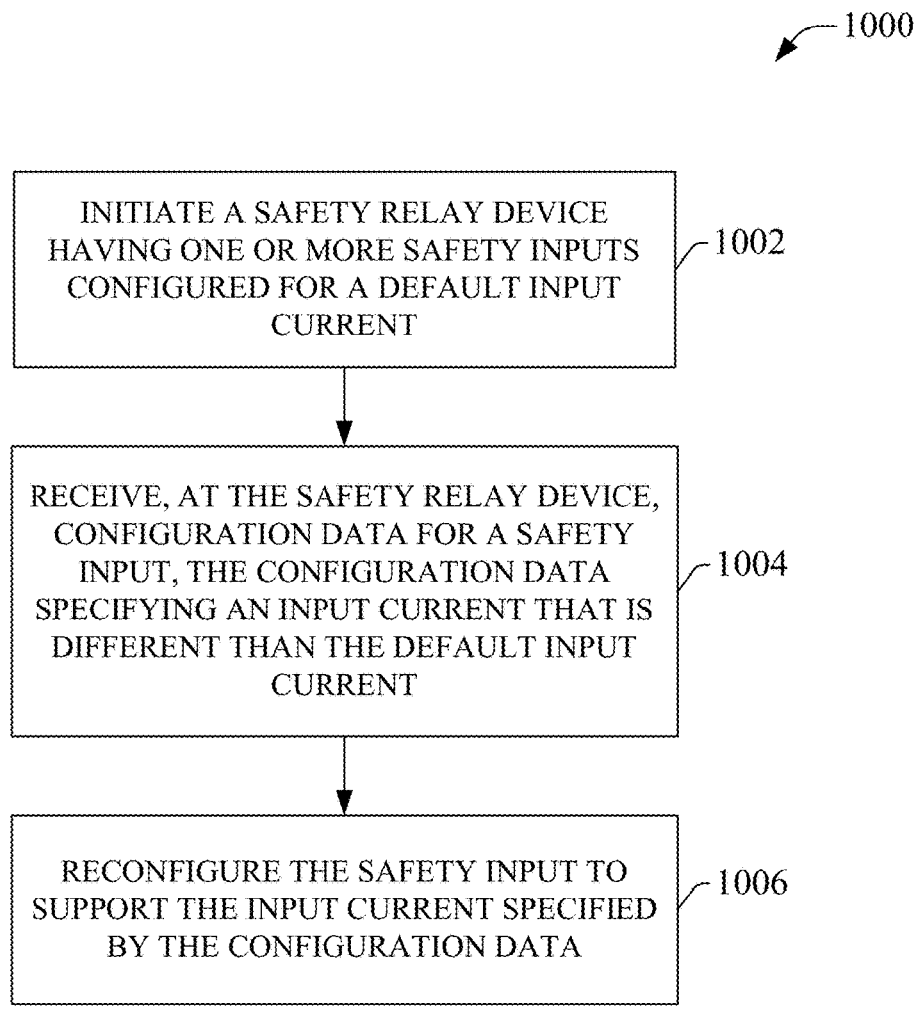
FIG. 10 is a flowchart of an example methodology for individually adjusting rated input currents for safety inputs of a safety relay device.
Figure 11:
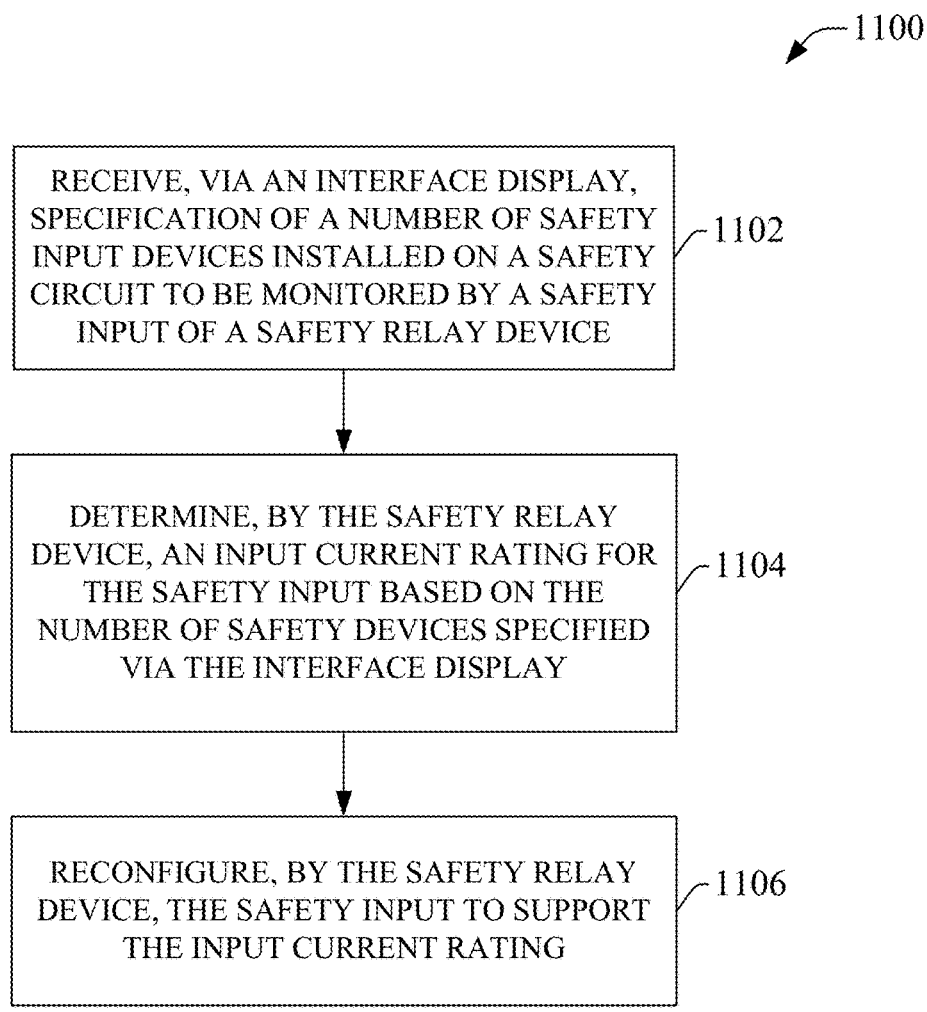
FIG. 11 configuring an input current for a safety input of a safety relay device.

FIGS. 10-11 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 10 illustrates an example methodology 1000 for individually adjusting rated input currents for safety inputs of a safety relay device. Initially, at 1002, a safety relay device is initiated, where the safety relay device has one or more safety inputs for monitoring respective safety circuits (each comprising one or more safety input device), and the one or more safety inputs are rated for a default input current. At 1004, configuration data for one of the safety inputs is received at the safety relay device, where the configuration data specifies an input current for the safety input that is different than the default input current. The configuration data can be received, for example, from a safety relay configuration tool that executes on a client device and exchanges data with the safety relay device over a wired or wireless connection. The configuration data can also be received via one or more interface displays generated by the safety relay device and served to a client device, where the interface displays prompt the user for selection of a desired input current for the safety input. At 1006, the safety input is reconfigured to support the input current specified by the configuration data. For example, when the configuration data is compiled, the safety relay device can reconfigure the monitoring circuitry associated with the safety input to change the input current rating to the specified current level (e.g., by changing an input impedance of the safety inputs monitoring circuit, and/or by performing other suitable reconfigurations to the safety input's monitoring circuitry).

FIG. 11 illustrates an example methodology 1100 for configuring an input current for a safety input of a safety relay device. Initially, at 1102, a number of safety input devices installed on a safety circuit to be monitored by a safety input of a safety relay device is received via an interface display. The number of devices can be specified, for example, by entering the number in a data entry field, by selecting the number from a drop-down window, or by another data entry means. At 1104, the safety relay determines an input current rating for the safety input based on the number of safety devices received via the interface display. In some embodiments, the safety relay can select an input current from a set of predefined input current settings determined to be suitable for driving a safety circuit having the indicated number of safety devices. At 1106, the safety input is reconfigured by the safety relay device to support the input current rating determined at step 1104.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 12:
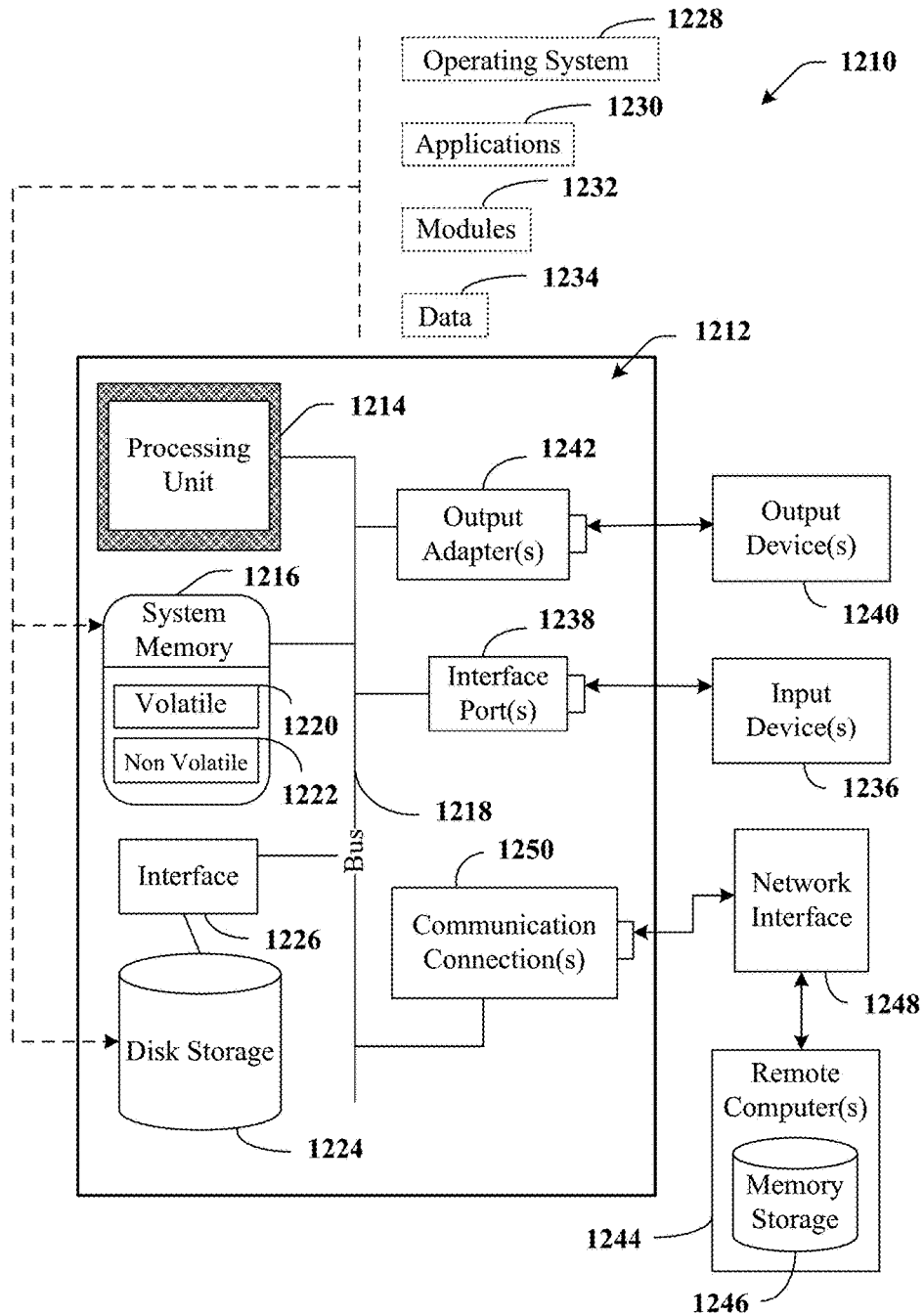
FIG. 12 is an example computing environment.
Figure 13:
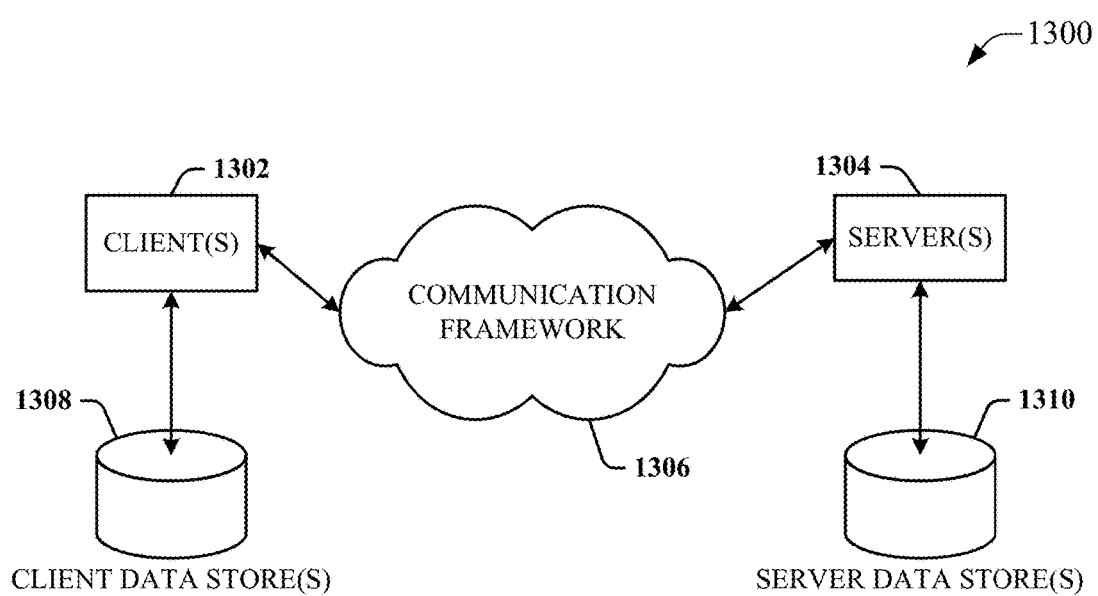
FIG. 13 is an example networking environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. With reference to FIG. 12, an example environment 1210 for implementing various aspects of the aforementioned subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Multi-core microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable PROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer 1212. System applications 1230 take advantage of the management of resources by operating system 1228 through program modules 1232 and program data 2834 stored either in system memory 1216 or on disk storage 1224. It is to be appreciated that one or more embodiments of the subject disclosure can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapters 1242 are provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the system bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a sample computing environment 1300 with which the disclosed subject matter can interact. The sample computing environment 1300 includes one or more client(s) 1302. The client(s) 1302 can be hardware and/or software (e.g., threads, processes, computing devices). The sample computing environment 1300 also includes one or more server(s) 1304. The server(s) 1304 can also be hardware and/or software (e.g., threads, processes, computing devices). The servers 1304 can house threads to perform transformations by employing one or more embodiments as described herein, for example. One possible communication between a client 1302 and servers 1304 can be in the form of a data packet adapted to be transmitted between two or more computer processes. The sample computing environment 1300 includes a communication framework 1306 that can be employed to facilitate communications between the client(s) 1302 and the server(s) 1304. The client(s) 1302 are operably connected to one or more client data store(s) 1308 that can be employed to store information local to the client(s) 1302. Similarly, the server(s) 1304 are operably connected to one or more server data store(s) 1310 that can be employed to store information local to the servers 1304.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A safety relay device, comprising:
   a memory that stores executable components;
   a processor, operatively coupled to the memory, that executes the executable components, the executable components comprising:
      a configuration interface component configured to receive configuration data identifying a safety input, of a set of safety inputs supported by the safety relay device, and specifying an input current level; and
      an input current configuration component configured to, in response to receipt of the configuration data, configure a monitoring circuit associated with the safety input to operate in accordance with the input current level.

2. The safety relay device of claim 1, wherein the input current configuration component is configured to change an input impedance of the monitoring circuit to facilitate configuration of the monitoring circuit to operate in accordance with the input current level.

3. The safety relay device of claim 1, wherein configuration of the monitoring circuit to operate in accordance with the input current level causes the safety input to draw an input current that is substantially equal to the input current level while a safety signal voltage is applied to the safety input.

4. The safety relay device of claim 1, wherein the configuration interface component is configured to generate an interface display that prompts for selection of the input current level from a set of defined input current levels.

5. The safety relay device of claim 1, wherein the configuration interface component is configured to generate an interface display that prompts for selection of a number of safety input devices that are installed on a safety circuit to be monitored by the safety input, and the input current configuration component is configured to select the input current level based on the number of safety input devices.

6. The safety relay device of claim 1, wherein
   the configuration interface component is configured to generate an interface display that prompts for selection of one or more types of safety input devices that are installed on a safety circuit to be monitored by the safety input and respective one or more numbers of the one or more types of safety input devices that are installed on the safety circuit, and
   the input current configuration component is configured to select the input current level based on the one or more types and the respective one or more numbers.

7. The safety relay device of claim 6, wherein the one or more types of safety input devices comprise at least one of an emergency stop push button, a photoelectric sensor, a safety mat device, a safety pull-cord device, or a safety door switch.

8. The safety relay device of claim 1, wherein the configuration interface component is configured to receive the configuration data from a configuration application that executes on a client device that is communicatively connected to the safety relay device.

9. The safety relay device of claim 1, wherein the configuration data is generated based on settings of one or more hardware switches of the safety relay device.

10. The safety relay device of claim 1, further comprising safety circuitry that controls a state of a safety contact based on detection of a safety signal at the safety input by the monitoring circuit.

11. A method, comprising:
   receiving, by a safety relay device, configuration data comprising identification of a safety input supported by the safety relay device and input current information; and
   in response to the receiving, configuring, by the safety relay device, the safety input identified by the configuration data to operate at a rated input current determined based on the input current information.

12. The method of claim 11, wherein the configuring comprises adjusting an input impedance of a monitoring circuit associated with the safety input.

13. The method of claim 11, wherein the receiving comprises:
   generating, by the safety relay device, an interface display configured to display a set of defined input current levels; and
   receiving, as the configuration data, a selection of the rated input current from the set of defined input current levels.

14. The method of claim 11, wherein
   the receiving comprises receiving, via an interface display, selection of a number of safety input devices that are installed on a safety circuit to be monitored by the safety input, and
   the configuring comprises determining the rated input current based on the number of safety input devices.

15. The method of claim 11, wherein
   the receiving comprises receiving, via an interface display, selection of one or more types of safety input devices that are installed on a safety circuit to be monitored by the safety input and respective one or more numbers of the one or more types of safety input devices that are installed on the safety circuit, and the configuring comprises determining the rated input current based on the one or more types of safety input devices and the respective one or more numbers of the one or more types of the safety devices.

16. The method of claim 15, wherein the receiving the selection of the one or more types of safety input devices comprises receiving selection of at least one of an emergency stop push button, a photoelectric sensor, a safety mat device, a safety pull-cord device, or a safety door switch.

17. The method of claim 11, wherein the receiving comprises receiving the configuration data from a configuration application executing on a client device that is communicatively connected to the safety relay device.

18. The method of claim 11, further comprising generating the configuration data based on settings of one or more hardware switches of the safety relay device.

19. A non-transitory computer-readable medium having stored thereon instructions that, in response to execution, cause a safety relay device comprising a processor to perform operations, the operations comprising:

receiving configuration data that specifies a safety input supported by the safety relay device and input current information; and in response to the receiving, configuring monitoring circuitry associated with the safety input to operate at a rated input current determined based on the input current information.

20. The non-transitory computer-readable medium of claim 19, wherein the configuring comprises adjusting an input impedance of the monitoring circuit.

* * * * *